Figure 1:
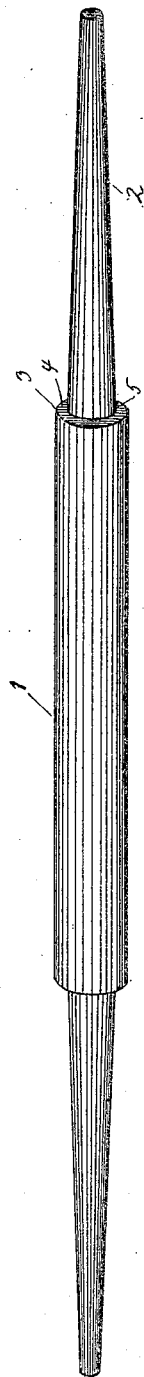

W. S. SIGLER.
TRANSPORTING BAR FOR PIPES.
APPLICATION FILED NOV. 2, 1908.

938,023.

Patented Oct. 26, 1909.

Witnesses:
J. M. Wynkoop.
B. F. Funk

Inventor:
Winfield Steiner Sigler
By
Emil Bonnelycke
Atty

UNITED STATES PATENT OFFICE.

WINFIELD STEINER SIGLER, OF MEXICO, MEXICO.

TRANSPORTING-BAR FOR PIPES.

938,023.        Specification of Letters Patent.        Patented Oct. 26, 1909.

Application filed November 2, 1908. Serial No. 460,768.

*To all whom it may concern:*

Be it known that I, WINFIELD STEINER SIGLER, a citizen of the United States of America, residing at Avenida 15, San Pedro, Mexico D. F., Mexico, have invented certain new and useful Improvements in Transporting-Bars for Pipes, of which the following is a specification.

In moving from one place to another heavy sections of large diameter pipes such as sewer pipes it is customary to pass through them in a direction parallel with the axis, long transporting bars, customarily of uniform section, having their ends projecting sufficiently beyond the ends of the pipe section to enable one or more men to shoulder said ends according to the weight of the pipe. As such pipes frequently run up to very large diameters, 60 inches and more being not uncommon, the transporting bar must necessarily be of very much smaller diameter, and not entirely filling the tube is bound to bear unequally against the forward or rear edge of the upper supporting surface resting upon the bar, in case there is the slightest inequality in lifting effort between the two ends. Especially is this the case when the weight of the pipe is first taken off the ground by such means, as the lifting party at one end is very apt to lift before or after that at the other. As soon as the bar is thus canted out of parallelism with the pipe's axis the entire weight will come upon the inner upper corner of that end of the pipe at which the lifting effort is stronger or sooner. While such pipes are abundantly strong enough to resist uniform internal fluid pressure or uniform external crushing stress as of the earth with which they are covered they cannot from the nature of their material—concrete, cement, glazed clay, plain earthenware, asphaltum, bitumen etc. resist powerful stresses concentrated at one point tending to local deformation or rupture. More particularly is this the case at the pipe ends where the exposed corners have no support whatever on one side. Hence in moving pipes using the present transporting bar there result very many fractured edges, frequently entailing total loss of the injured section. In my experience I have found the percentage of such fractures to run very high. The loss is very much increased where, as is sometimes the case, the thickness of the pipe walls is reduced for a short distance back from each end to provide for especial means of connecting sections.

My invention aims to reduce the percentage of such loss if not entirely to wipe it out, by so proportioning the improved transporting bar that should it be canted out of parallelism with the pipe's axis the weight of the pipe will bear upon the bar not at the edge, but well inside the edge where the pipe walls mutually support their constituent parts in all directions. This object I attain by the construction illustrated in the accompanying drawing in which—

Figure 2:

Figure 1 is a perspective view of the improved transporting bar and Fig. 2 is a perspective view of a modification thereof.

The bar is circular in section throughout its length, it has an actual weight-carrying or bearing portion of a uniform diameter throughout its length, which length is proportioned to fall short of the length of the pipe section to be carried so that when the offsets or shoulders 3 at each end of the bearing portion are brought to an equal distance from each end of the pipe section by suitably moving the bar along the inside of the pipe, the said offsets will be well within the pipe at a distance from its end proportioned to the weight and thickness thereof. The transporting bar-handles 2 extend at an equal distance from the shoulders 3 which are formed by reducing the ends of the bar point from that of portion 1 to the initial diameter of portion 2.

In Fig. 1 I have shown this reduction of diameter as abrupt, forming a jog or shoulder having a flat face 4 and a sharp corner 5, but I may without prejudice to my invention use a more gradual reduction of diameter as shown in Fig. 2 giving the shoulder 3ª, a smooth transition 4ª between the diameters of portions 1ª and 2ª and a curved bearing portion 5ª corresponding to the shoulder 3 of Fig. 1 upon which will come the weight of the pipe in case the transporting bar is lifted unequally. The handles are *e* and of a length proportioned to the number of men needed on each end to carry the pipe section to which the bar correspond. For in this practice different sizes of bars must be provided for sections differing materially in length or weight, although one size of bar will answer for a fairly large range of pipe diameters provided that the section length remain the same.

The bar is preferably made of wood but may be of iron or steel suitably disposed.

I claim:

A carrier for pipes and similar hollow articles composed of a bar having a body of uniform diameter throughout and a handle at each end of the body of less diameter than said body, said bar being adapted to be passed longitudinally through the pipe opening and having its body portion of less length than that of the pipe whereby the ends of the pipe will project beyond the ends of said body to overlie the handles and be spaced therefrom so that the extreme ends of the pipe will be out of contact with the bar body and the handles to prevent rupture of the pipe ends by contact with the carrying medium.

In testimony whereof I affix my signature in presence of two witnesses.

WINFIELD STEINER SIGLER.

Witnesses:
J. GRANDJEAN,
JOSÉ MATA.